United States Patent [19]

Specktor et al.

[11] Patent Number: 4,970,801
[45] Date of Patent: * Nov. 20, 1990

[54] TOOL FOR ADJUSTING CAMBER AND CASTER

[75] Inventors: Gerald A. Specktor, St. Paul; John Specktor, Golden Valley, both of Minn.

[73] Assignee: Shim-A-Line, Inc., Minneapolis, Minn.

[*] Notice: The portion of the term of this patent subsequent to May 23, 2006 has been disclaimed.

[21] Appl. No.: 343,831

[22] Filed: Apr. 26, 1989

[51] Int. Cl.$^5$ .............................. B62D 17/00
[52] U.S. Cl. ..................... 33/600; 280/661
[58] Field of Search ............ 33/600, 612, 203.8, 33/193; 280/661; 29/271, 407

[56] References Cited

U.S. PATENT DOCUMENTS

| | | | |
|---|---|---|---|
| 2,859,058 | 11/1958 | Traugott | 287/53 |
| 2,923,555 | 2/1960 | Kost et al. | 280/96.1 |
| 3,163,441 | 12/1964 | Traugott | 280/96.2 |
| 3,342,507 | 9/1967 | Koch et al. | 280/96.1 |
| 3,866,938 | 2/1975 | Boyd et al. | 280/96.2 B |
| 4,026,578 | 5/1977 | Mattson | 280/661 |
| 4,232,880 | 11/1980 | Dickerson et al. | |
| 4,252,338 | 2/1981 | Ingalls et al. | 280/661 |
| 4,400,007 | 8/1983 | Ingalls | 280/661 |
| 4,509,772 | 4/1985 | Drotar et al. | 280/661 |
| 4,641,853 | 2/1987 | Specktor et al. | 280/661 |

OTHER PUBLICATIONS

Ingalls Catalog No. 840, Ingalls Engineering Company, Inc., 1984.

Primary Examiner—Harry N. Haroian
Attorney, Agent, or Firm—Kinney & Lange

[57] ABSTRACT

A tool for adjusting the alignment in a wheeled vehicle steering structure using a bushing includes a plate having indicia disposed around an aperture that runs through the plate wherein the indicia indicate an angular position for rotatably adjusting the bushing and including a mechaism for securing the plate to the steering structure in a selectable and fixed position and for retaining the bushing in a position during alignment.

8 Claims, 4 Drawing Sheets

Fig. 6A

RIGHT WHEEL CHART

Fig. 6B

LEFT WHEEL CHART

(Chart 116: caster/camber adjustment table with REDUCE CAMBER / INCREASE CAMBER columns and REDUCE CASTER / INCREASE CASTER rows, ranging from 1½° through 0° to 1½°.)

TOOL FOR ADJUSTING CAMBER AND CASTER

REFERENCE TO CO-PENDING APPLICATION

This is a continuation-in-part of pending application Ser. No. 07/104,323, filed on Oct. 2, 1987, now Pat. No. 4,831,744.

BACKGROUND OF THE INVENTION

The present invention relates generally to devices for aligning the steering structure of a wheeled vehicle. In particular, it relates to tools used to define the rotational position of a bushing in aligning the steering structure of a wheeled vehicle.

It is necessary to maintain proper wheel alignment in many vehicles, particularly automobiles. Many methods of adjusting wheel alignment in vehicles are known in the art. Typically, camber and caster must be periodically adjusted.

Camber is defined as the angle between a line extending through the centerline of a typical steering knuckle and the centerline of the tire, as viewed from the rear of the vehicle. A vehicle has a slight positive camber when the top of the tire is tipped outwardly away from the side of the vehicle. It is known in the art that a slight positive camber, which is measured in degrees, prevents premature tire wear by compensating for deflections in the steering axle and by compensating for road bed crowns.

Caster is a measure of the angle between the centerline of typical steering knuckle and the vertical, as viewed from the side of the vehicle. A wheel having a slight positive caster has a steering knuckle axis that is tipped slightly toward the rear of the vehicle from the vertical. A slight positive caster causes the vehicle to track more easily, and improves steering stability.

Caster and camber settings are typically specified in the design of an automobile, and preset in the manufacturing facility. Poor road conditions, vehicle accidents, and normal wear cause steering assemblies to fall out of adjustment. Many devices have been invented for the purpose of adjusting camber and caster in vehicles. The type of device needed for a particular vehicle may depend upon the configuration of the steering structure.

For example, Dickerson et al. U.S. Pat. No. 4,232,880 discloses an adjusting sleeve for adjusting the camber of a wheel assembly. Drotar et al. U.S. Pat. No. 4,509,772 discloses a similar adjusting sleeve for simultaneously adjusting camber and caster in a wheel assembly. In order for the sleeve to function properly, the sleeve cannot rotate. Ingalls U.S. Pat. No. 4,400,007 discloses an adjusting sleeve with a locking mechanism for preventing rotation of the sleeve after installation.

The Drotar et al. U.S. Pat. No. 4,509,772 is a typical example of an invention which simultaneously adjusts both camber and caster. Because camber and caster usually cannot be independently adjusted, the task of achieving acceptable readings for both is often difficult. This dependence often makes the task of alignment more of an art than a science.

The prior art has attempted to address the problem of simultaneous camber and caster adjustment by providing alignment devices having indicators which allow the repairman to make steering assembly adjustments without having to perform unnecessary remeasuring and reassembling steps.

Koch et al. U.S. Pat. No. 3,342,507 discloses a mechanism for adjusting camber in heavy axled vehicle having kingpin construction. The Koch et al. Patent describes the use of a position indicator on the kingpin to determine a desired rotational position of a bushing surrounding the kingpin. Adjustments in camber require shimming between the spring pad and the spring to restore caster.

Specktor et al. U.S. Pat. No. 4,684,150, assigned to the same assignee as the present application, discloses a camber and toe adjustment mechanism consisting of a tapered shim having indicia on the shim surface. The shim is placed between the wheel mount and the end plate of a wheel axle.

Although camber and camber adjustment with the use of position indicators are known in the art, few inventions disclose the use of special tools to adjust alignment. Kost et al. U.S. Pat. No. 2,923,555 discloses a camber, toe and caster adjustment mechanism for truck wheel mounting. The Kost et al. U.S. Pat. No. 2,923,555 includes a removable scale for adjusting the position of a bearing supporting a steering joint. The scale extends roughly one third the way around the adjustment nut, and is removably attached to the front axle.

Specktor et al. U.S. Pat. No. 4,641,853, assigned to the same assignee as the present application, discloses an adjustment bushing and a removable scale for adjusting camber and caster. The bushing has an outer cylindrical surface. The removable scale is positioned on the outer cylindrical surface, and must be removed before the bushing is installed. The mechanic cannot check to make sure the bushing is properly positioned once the bushing has been installed.

SUMMARY OF THE INVENTION

The present invention includes a tool for adjusting the alignment in a wheeled vehicle steering structure using a bushing in which the tool includes a plate with an aperture running therethrough and indicia disposed around the aperture for indicating an angular position for rotatable adjustment of the bushing with respect to the steering structure and means for securing the plate to the steering structure in a selectable and fixed position and for retaining the bushing in position during alignment.

BRIEF DESCRIPTION OF THE DRAWINGS

FIG. 6A and 6B each illustrate reference charts that indicate the camber and caster adjustments for a right and a left wheel steering structure, respectively.

DETAILED DESCRIPTION OF THE PREFERRED EMBODIMENTS

Allowed U.S. application having Ser. No. 07/104,323 filed on Oct. 2, 1987, and entitled "Bushing Indexing Tool and Method for Caster and Camber Adjustment" is hereby incorporated by reference.

Figure 1:
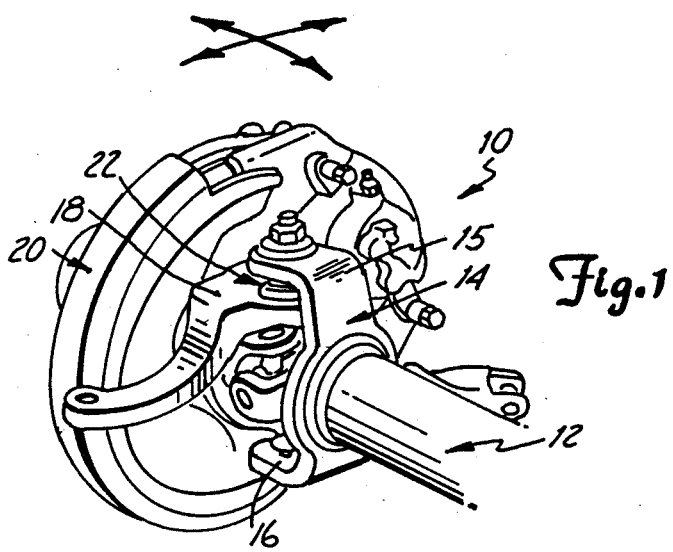
FIG. 1 is a perspective view of a steering assembly of a wheeled vehicle.

A typical steering assembly for a vehicle having wheels is illustrated in FIG. 1. The steering assembly 10 includes a steering axle 12, terminating at a steering yolk 14 having an upper steering yolk arm 15 and a lower steering yolk arm 16. The upper and lower steering yolk arms 15 and 16 are vertically spaced from each other. The steering assembly also includes a wheel spindle assembly 20. The wheel spindle assembly 20 has an upper spindle arm 18 and a lower spindle arm (not shown). The upper spindle arm 18 and lower spindle arm are vertically spaced from each other and pivotally attached to the upper steering yolk arm 15 and lower steering yolk arm 16 by an upper U-joint 22 and a lower U-joint (not shown).

Steering assemblies of vehicles having wheels are normally adjusted at the factory to design specifications to achieve a desired camber and caster alignment. Front end alignment is achieved in a typical wheeled vehicle by altering the angular relationship between the wheel spindle assembly 20 and the steering yolk 14.

Figure 3:
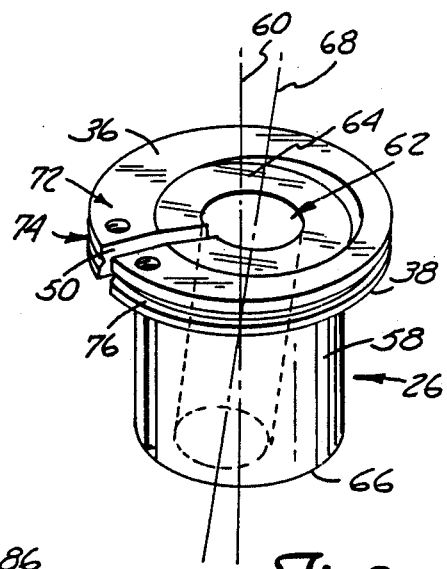
FIG. 3 is a perspective view of the adjustment bushing.
Figure 2:
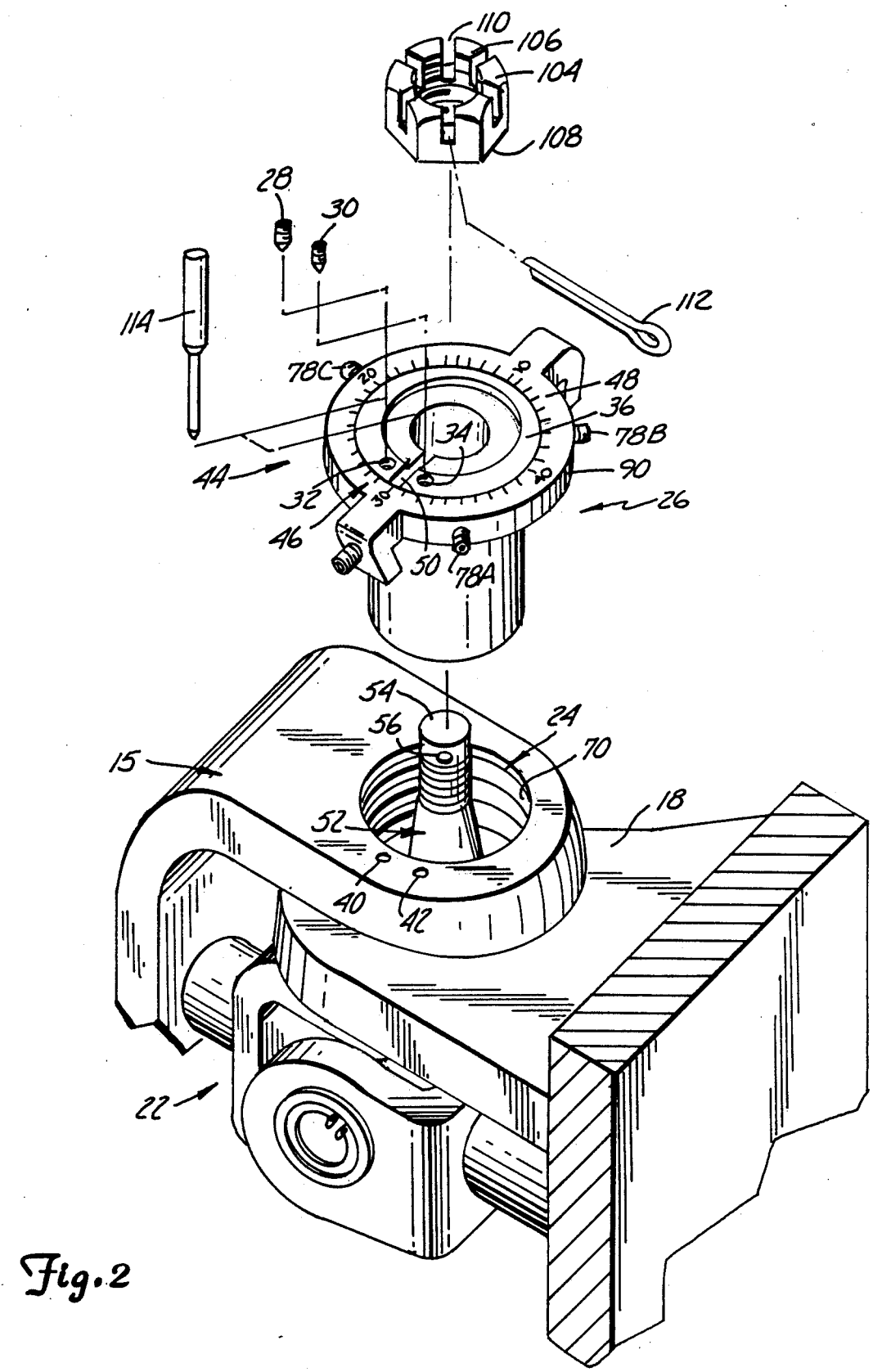
FIG. 2 is an exploded view of an upper U-joint assembly including a bushing and a tool of the present invention.

An exploded view of an upper U-joint 22 in a steering assembly 10 is illustrated in FIG. 2. The upper steering yolk arm 15 has an aperture 24 for receiving a bushing 26. The present invention includes a series of adjustment bushings, each adjustment bushing 26 having a range of adjustment capability. An adjustment bushing 26 is installed in the aperture 24 to modify the angular relationship between steering yolk 14 and wheel spindle assembly 20. The adjustment bushing 26 has an upper flange surface 36 and a lower flange surface 38. The adjustment bushing 26 is locked into a preselected rotational position with a pair, of setscrews 28 and 30 extending through first and second apertures 32 and 34 intersecting the upper and lower flange surfaces 36 and 38 (as shown in FIG. 3).

Although the adjustment bushing 26 in the preferred embodiment is positioned in the aperture 24 of the upper steering yolk arm 15, the adjustment bushing 26 may be positioned in the aperture (not shown) of the lower steering yolk arm 16, if the lower steering yolk arm 16 is positioned below the lower spindle arm (not shown). If the lower spindle arm is positioned below the lower steering yolk arm 16, the bushing 26 is positioned in the lower spindle arm aperture (not shown). In steering assemblies designed so that the upper spindle arm 18 is positioned above the upper steering yolk arm 15, the bushing 26 is positioned in the aperture (not shown) of the upper spindle arm 18.

The present invention includes a positioning tool 44 for setting the desired rotational position of the adjustment bushing 26 in the aperture 24. In the preferred embodiment, the positioning tool 44 is constructed of cast steel. The positioning tool 44 clamps to the upper steering yolk arm 15. In another embodiment, the positioning tool 44 clamps to the lower steering yolk arm 16. In still another embodiment, the positioning tool 44 is clamped to either the upper spindle arm 18 or to the lower spindle arm (not shown). The positioning tool 44 has an upper tool surface 46 having an indicating scale 48. The bushing 26 also has a radial slot 50.

In the preferred embodiment, the upper U-joint 22 consists of a U-joint ball (not shown) . integrally attached to a tapered upper U-joint shaft 52 having an upper end 54. In the preferred embodiment, the upper end 54 is of a smaller diameter than the end terminating at the U-joint ball (not shown) and is threaded. The upper U-joint shaft 52 has an outer surface. The upper end 54 has a cylindrical cavity 56 extending radially through the shaft, bisecting the outer surface.

In one preferred embodiment, the U-joint ball (not shown) is positioned in the upper spindle arm aperture (not shown), and the bushing 26 is positioned in the aperture 24 of the upper steering yolk arm 15. The upper end 54 of the upper U-joint shaft 52 is located above the U-joint ball (not shown), and the upper steering yolk arm 15 is located upwardly of the upper spindle arm 18.

In another preferred embodiment, the upper U-joint shaft 52 is mounted in an aperture (not shown) of the lower steering yolk arm 16 with the shaft end 54 pointing downwardly. The bushing 26 in this preferred embodiment is located in a lower spindle arm aperture (not shown).

Alternatively, if the steering assembly 10 is constructed such that the upper spindle arm 18 is located upwardly of upper steering yolk arm 16, the bushing could instead be installed in the upper spindle arm aperture (not shown). Typically, the adjustment bushing 26 of the present invention is installed only in the upper U-joint 22. However, it is possible to install an adjustment bushing 26 in a lower U-joint (not shown), or in both U-joints.

The bushing 26 of the present invention is illustrated in FIG. 3. The bushing 26 has a cylindrical surface 58, of substantially the same diameter as the aperture 24 (as shown in FIG. 2) of the upper steering yolk arm 15. The adjustment bushing 26 has a cylindrical axis 60 that is parallel to the cylindrical surface 58. The adjustment bushing 26 has an upper locking surface 64. The adjustment bushing 26 has a throughbore 62 and a lower surface 66. The throughbore 62 completely bisects the upper locking surface 64 and the lower surface 66. The throughbore 62 in the preferred embodiment has a throughbore axis 68 which is skewed and offset with respect to the cylindrical axis 60. The throughbore axis 68 in another preferred embodiment is offset with respect to the cylindrical axis 60. The cylindrical axis 60 in the preferred embodiment intersects the throughbore axis 68 between upper locking surface 64 and the lower surface 66. However, the cylindrical axis 60 and the throughbore axis 68 may intersect at a point above the upper locking surface 64 or below the lower surface 66. Similarly, the cylindrical axis 60 need not intersect the throughbore axis 68 at all.

The throughbore 62 in the preferred embodiment is tapered. The upper opening defined by the intersection of the throughbore 62 with the upper locking surface 64 is of a smaller diameter than the diameter of the lower opening defined by the intersection of the throughbore 62 with the lower surface 66.

Typically, the U-joint shaft 52 (as shown in FIG. 2) is tapered. The larger end is located at the U-joint ball (not shown). The U-joint shaft 52 in the preferred embodiment tapers inwardly terminating at the upper end 54. The taper in the throughbore 62 is sized to receive the taper on the upper U-joint shaft 52 in a close-fitting relationship. By inserting the upper end 54 of the U-joint shaft 52 into the lower opening of the lower surface 66 of the adjustment bushing 26, and by sliding the adjustment bushing 26 onto the U-joint shaft 52, the bushing is secured over the U-joint shaft 52 in a tight-fitting relationship. At the same time, the outer cylindrical surface 58 of the bushing 26 is positioned in the aperture 24 of the upper steering yolk arm 15.

The aperture 24 (as shown in FIG. 2) in the preferred embodiment has a substantially smooth inner cylindrical surface 70. The surface 70 is of substantially the same diameter as the diameter defined by the outer cylindrical surface 58 of the adjustment bushing 26. The adjustment bushing 26 fits tightly into the aperture 24.

The adjustment bushing 26 in the preferred embodiment has an upper flange 72 extending radially outward from the upper locking surface 64. The upper flange surface 36 of the upper flange 72 in one preferred embodiment is perpendicular to the cylindrical axis 60 and is an axial stop for the bushing 26 (as shown in FIG. 2). The upper flange 72 has an outer cylindrical surface 74 having a centrally located outer cylindrical groove 76.

The bushing 26 has a radial slot 50 extending from the upper flange surface 36 to the lower surface 66 and extends from the outer cylindrical surface 74 of the flange 72 inwardly intersecting the inner surface defined by the throughbore 62.

The radial slot 50 allows the adjustment bushing 26 to expand along the cylindrical surface 58 as an upward force is applied by the tapered upper U-joint shaft 52 (as shown in FIG. 2). The radial expansion of the cylindrical surface 58 provides one method for securing the bushing 26 into locking engagement with the inner cylindrical surface 70 of the aperture 24. The radial slot 50 also indicates the rotational position of the bushing 26 in the aperture 24.

Figure 4:
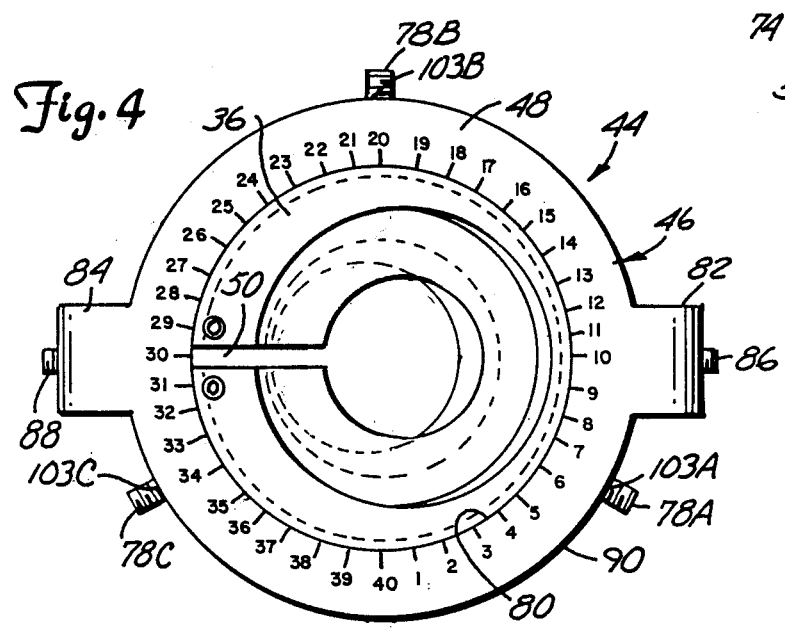
FIG. 4 is a top view of the bushing and the tool of the present invention.

The positioning tool 44, generally indicated at FIG. 4, is used for installing the bushing 26 in the aperture 24 at a predetermined rotational position. The positioning tool 44 has an aperture 80 of substantially the same diameter as the diameter defined by the outer cylindrical surface 74 of the upper flange 72 (as shown in FIG. 3). The positioning tool 44 has a first clamping ear 82 and a second clamping ear 84. The positioning tool 44 also has first and second setscrews 86 and 88 located on the first and second clamping ears 82 and 84. The tool 44 also has an indicating scale 48 positioned on the upper tool surface 46. The indicating scale 48 consists of a plurality of indicating marks spaced around the outer circumference defined by the aperture 80 of the tool 44. The clamping ears 84 and 86 secure the positioning tool 44 onto the upper surface of upper steering yolk arm 15.

Figure 5:
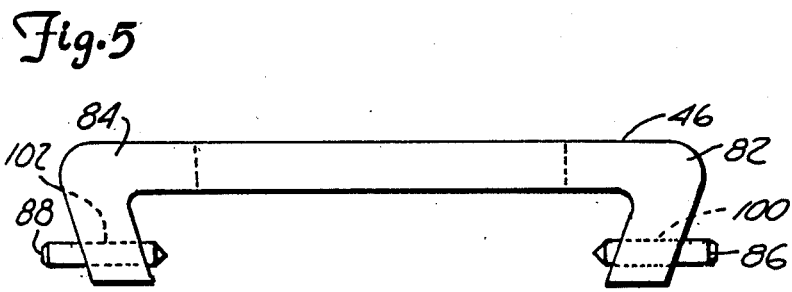
FIG. 5 is an elevational view.

The locking ears 82 and 84, as indicated in FIG. 5, are oppositely spaced on the outer surface 90, as illustrated in FIG. 2, of the positioning tool 44. The clamping ears 82 and 84 in the preferred embodiment extend outwardly along the plane defined by the upper tool surface 46. In the preferred embodiment, the clamping ears 82 and 84 extend outwardly and bend downwardly. The first clamping ear 82 has an aperture 100 and the second clamping ear 84 has an aperture 102. The apertures 100 and 102 are positioned radially inward from the outer tool surface 90 (as shown in FIG. 2), inwardly terminating at the intersection of the inner surface defined by the tool aperture 80.

The first and second setscrews 86 and 88 are positioned in the threaded apertures 100 and 102, extend radially inward, engaging the outer cylindrical groove 76, as illustrated in FIG. 2. The upper flange 72, as illustrated in FIG. 3, of the adjustment bushing 26 is positioned in the aperture 80 of the positioning tool 44 such that the upper tool surface 46 is coplaner with the upper flange surface 36. The aperture 80 of the positioning tool 44 is aligned with the aperture 24, and the positioning tool 44 is installed on the upper surface of steering yolk arm 15.

The apertures 100 and 102 are threaded in the preferred embodiment to receive the setscrews 86 and 88 The tool 44 is installed on the upper steering yolk arm 15 with the first clamping ear 82 pointing toward the front of the vehicle. Typically, the first clamping ear 82 is marked "front" such that the positioning tool 44 is installed the same way each time the tool 44 is used.

The positioning tool 44 (as shown in FIG. 4) in the preferred embodiment has three apertures 103A, 103B, and 103C for receiving three radially positioned setscrews 78A, 78B, and 78C. The apertures 103A, 103B, and 103C are equally spaced along the outer surface 90 of the positioning tool 44. The apertures extend from the outer surface 90 and terminate at the intersection with the inner surface defined by the tool aperture 80. The apertures 103A, 103B, and 103C are threaded to receive the threaded setscrews 78A, 78B, and 78C. The setscrews 78A, 78B, and 78C extend inwardly past the inner surface defined by the tool aperture 80, and terminate in the outer cylindrical groove 76 (as shown in FIG. 3) of the bushing 26.

The positioning tool 44 is positioned on the bushing 26 as illustrated in FIG. 2. Because the rotational position of positioning tool 44 on the upper steering yolk arm 15 is fixed, the position of the indicating scale 48 is fixed. It is possible to set the bushing in the upper steering yolk aperture 24 in a multiplicity of rotational positions.

The positioning tool 44 is placed into the upper steering yolk arm 15, and the bushing 26 is installed in the aperture 24. The lower opening (not shown) of the throughbore 62 of the bushing 26 is positioned over the upper U-joint shaft end 54 and into the aperture 24. The bushing 26 is forced downwardly until the lower flange surface 38 (as shown in FIG. 3) rests on the upper steering yolk arm 15.

In order to use the positioning tool 44 of the present invention, the following installation steps are required. First, it is necessary to measure the existing camber and caster in the steering assembly to be realigned. Camber and caster are measured using conventional methods. The existing U-joint bushing (not shown) is removed to determine whether the throughbore is concentric or whether there is currently an adjustment bushing 26 in place. A shaft nut 104 positioned on the upper end 54 of the upper U-joint shaft 52 is removed, and the bushing (not shown) is lifted upwardly, and out of the aperture 24. If there is an adjustment bushing in place, a concentric bushing is installed and the existing camber and caster is measured.

The second step in the realignment procedure requires a calculation of the required camber and caster adjustment. By referring to factory specifications defining camber and caster, and by comparing the factory specifications to the actual measurements, the amount of necessary adjustment is calculated. The factory specifications, or standard measurements minus the actual measurements will define the amount of adjustment necessary in either the positive or negative direction. For example, if the right front tire requires a plus two degree caster measurement and the current measurement is minus one degree, a positive three degree adjustment is required.

Figure 6A:
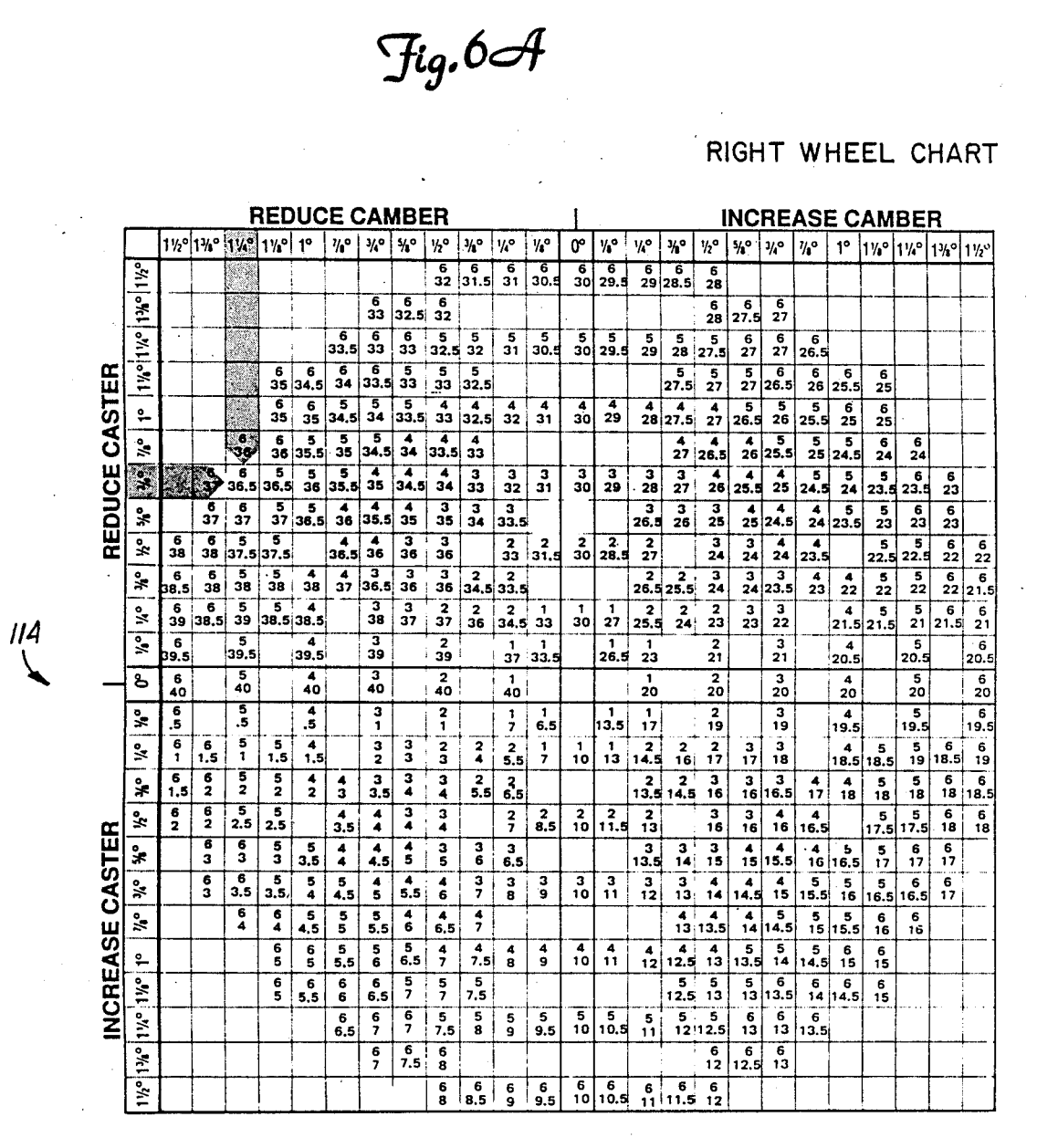

Next, by referring to reference charts similar to those indicated at 114 in FIG. 6A and indicated at 116 in FIG. 6B, camber and caster adjustments can be made. The reference charts 114 and 116 indicate which bushing 26 should be used. A plurality of bushings 26 are provided having throughbores 62 having a variety of axial orientations. The reference charts 114 and 116 also define which indicium on the indicating scale 48 that the radial slot 50 is to be aligned with to achieve the desired caster and camber settings. Each reference chart 114 and 116 has a plurality of boxes, each having two numbers. The upper number indicates the number corresponding to the selection of bushing. The lower number corresponds to the indicium on the indicating scale 48. The lower number defines the rotational position of the radial slot 50 in the aperture 24 (as illustrated in FIG. 4).

The setscrews 78A, 78B, and 78C on the positioning tool 44 are tightened until the set screws 78A, 78B, and 78C extend inwardly beyond the inner surface defined by the tool aperture 80 until contact is made with the outer cylindrical groove 76 of the bushing 26.

The upper U-joint shaft nut 104 is positioned on the threaded upper U-joint shaft end 54. The nut 104 is tightened to a specified torque, typically 90 foot-pounds. By applying torque to the upper U-joint shaft nut 104, the bushing 26 is forced to expand radially outward such that the outer cylindrical surface 58 engages the inner cylindrical surface 70 of upper steering yolk aperture 24.

The upper U-joint shaft nut 104 in the preferred embodiment is a six-sided hex nut. The nut 104 has an upper surface 106 and a lower surface 108. The upper surface 106 is radially bisected by a plurality of notches 110. In one preferred embodiment, there are six notches and the depth of the notches 110 is approximately half the distance between the upper surface 106 and the lower surface 108. After the upper U-joint shaft nut 104 is tightened onto the upper U-joint shaft 52, the nut is turned in the direction opposite that of tightening until the closest notch 110 is aligned with the cylindrical cavity 56 located on the upper U-joint shaft end 52. A locking device such as a cotter pin 112 is placed in the notch 110, through the cavity 56, and through a second opposite notch 110 of the shaft nut 104. This completes the first procedure for looking the bushing 26 into place.

Often the expansion of the cylindrical surface 58 is insufficient to adequately lock the cylindrical surface 58 securely onto the upper steering yolk aperture 24. For this reason, the present invention includes an additional locking mechanism for securing the bushing 26 into a fixed rotational position on the upper steering yolk arm aperture 24.

By installing a first and second aperture 32 and 34 on the upper flange 72 of the bushing 26 extending from the upper flange surface 36 through the lower flange surface 38 (as shown in FIG. 3), and by producing corresponding indentations 40 and 42 into the upper steering yolk arm 15, with a punch 114, the bushing is permanently locked into place by threading the setscrew 30 into the apertures 34 to engage indentation 42, and by threading the setscrew 28 into the apertures 32 to engage the indentation 40. The two threaded setscrews 28 and 30 secure the bushing 26 to the yolk arm 15.

The next step in realigning the steering structure of the vehicle includes removing the positioning tool 44. The setscrews 86, 88 and 78A, 78B, and 78C (as shown in FIG. 4) are loosened, and the positioning tool 44 is lifted off of the bushing 26.

The final step in aligning the steering structure of a wheeled vehicle of the type mentioned above includes measuring the final caster and camber and comparing that measurement to the factory specifications. By using the proper bushing 26, the positioning tool 44, and by using the reference chart of FIG. 6, it is possible to adjust camber and caster in the steering structure of a wheeled vehicle without further adjustment.

Although the present invention has been described with reference to preferred embodiments, workers skilled in the art will recognize that changes may be made in form and detail without departing from the spirit and scope of the invention.

What is claimed is:

1. A tool for assisting in aligning a wheel vehicle steering structure using a bushing, the tool comprising:
    a plate having an aperture running therethrough and an upper surface;
    indicia disposed around the aperture, the indicia indicating an angular position for rotatable adjustment of the bushing with respect to the steering structure; and
    means for holding the plate in relation to the steering structure in a selectable and fixed position and for retaining the bushing in position during alignment.

2. The device of claim 1, wherein the bushing has an outer edge, and the aperture is sized to receive the outer edge.

3. The device of claim 1 and further including locking means for securing the plate to the bushing.

4. The device of claim 1 wherein one of the means for securing the plate includes first and second ears extending from the plate disposed on opposite sides of the plate.

5. The device of claim 4 wherein the means for securing the plate includes first and second setscrews extending through first and second threaded apertures in the first and second ears.

6. The device of claim 1 wherein the indicia include a plurality of spaced apart indicia and further including chart means corresponding to selectable alignment changes in the steering structure.

7. A tool for assisting in aligning a wheeled vehicle steering structure having a rotatable caster and camber adjustment offset bushing, the tool comprising:
    a plate having an upper tool surface and an aperture in the upper tool surface extending through the plate;
    means for reproducably positioning the plate with respect to the steering structure; and
    scale means on the upper tool surface disposed around the aperture, having a plurality of indicia, the indicia indicating an angular position of the rotatable adjustment bushing with respect to the steering structure.

8. The tool of claim 7 wherein at least one of the indicia is referenced in a database means, the database means providing relationship between an indicia and a caster and camber combination.

* * * * *